(12) United States Patent
Boatright (10) Patent No.: US 8,664,361 B2
(45) Date of Patent: Mar. 4, 2014

(54) SOY PRODUCTS WITH REDUCED LEVELS OF SULFITE, FREE RADICALS AND METHANETHIOL

(75) Inventor: William L. Boatright, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 1825 days.

(21) Appl. No.: 11/516,674

(22) Filed: Sep. 7, 2006

(65) Prior Publication Data

US 2007/0087065 A1    Apr. 19, 2007

Related U.S. Application Data

(63) Continuation-in-part of application No. 10/421,955, filed on Apr. 24, 2003, now Pat. No. 7,147,878.

(60) Provisional application No. 60/375,429, filed on Apr. 26, 2002.

(51) Int. Cl.
*A23J 1/14* (2006.01)

(52) U.S. Cl.
USPC .............. 530/378; 424/757; 524/25; 435/426

(58) Field of Classification Search
USPC ........................................................ 424/400
See application file for complete search history.

(56) References Cited

U.S. PATENT DOCUMENTS

| | | | | |
|---|---|---|---|---|
| 3,630,753 A * | 12/1971 | Melnychyn et al. | ........... | 530/378 |
| 3,855,238 A | 12/1974 | Batesky et al. | | |
| 4,259,364 A * | 3/1981 | Chung | ........................ | 426/656 |
| 4,943,441 A * | 7/1990 | McCabe | ....................... | 426/511 |
| 6,426,112 B1 | 7/2002 | Boatright | | |
| 7,147,878 B2 * | 12/2006 | Boatright | ...................... | 424/761 |
| 2002/0142069 A1 * | 10/2002 | Elmusa | .......................... | 426/52 |
| 2005/0058691 A1 * | 3/2005 | Wedekind et al. | ............ | 424/442 |
| 2005/0202155 A1 * | 9/2005 | Lamstein | ...................... | 426/656 |

OTHER PUBLICATIONS

W.L. Boatright et al., "Soy Protein Isolate Solubility and Surface Hydrophobicity as affected by Antioxidants", Journal of Food Science, vol. 60, No. 4, 1995, pp. 798-800.

W.L. Boatright et al., "Effect of Gallic Acid on the Aroma Constituents of Soymilk and Soy Protein Isolates", JAOCS, vol. 79, No. 4, (2002), pp. 317-323.

W.L. Boatright et al., "Headspace Evaluation of Methanethiol and Dimethyl Trisulfide in Aqueous Solutions of Soy-protein Isolates", Journal of Food Science, vol. 65, No. 5, 2000, pp. 819-821.

Q. Lei et al., "Development of a New Methanethiol Quantification Method Using Ethanethiol as an Internal Standard", Journal of Agricultural and Food Chemistry, vol. 49, No. 8, pp. 3567-3572, 2001.

Q. Lei et al., "Compounds Contributing to the Odor of Aqueous Slurries of Soy Protein Concentrate", Journal of Food Science, vol. 66, No. 9, 2001, pp. 1306-1310.

P. Singh, et al.: "Functional and Edible Uses of Soy Protein Products", Comprehensive Reviews in Food Science and Food Safety, 2008 Institute of Food Technologies, vol. 7, pp. 14-28.

* cited by examiner

*Primary Examiner* — James Rogers (74) *Attorney, Agent, or Firm* — McDermott Will & Emery LLP (57) ABSTRACT

Soy products or compositions are treated with a food grade iodate compound or a cystine compound to reduce levels of methanethiol, sulfites and sulfite free-radicals, sulfate free radicals and other free radicals generated from sulfite free radicals in the soy products or compositions by 1% to 95%.

8 Claims, 5 Drawing Sheets

Mass spectra of headspace methanethiol produced from an aqueous slurry of isolated soybean proteins. A: with unlabeled sulfite (3.2 mM) and unlabeled methionine (4.0 mM); B: with unlabeled sulfite (3.2 mM) and L-methionine-methyl-$^{13}C_1$ (4.0 mM).

FIG. 1

Mass spectra from methanethiol formed in aqueous slurry of ISP with A: with unlabeled sulfite (3.2 mM) and unlabeled methionine (4.0 mM); B: with labeled 34-sulfite (3.2 mM) and unlabeled L-methionine (4.0 mM).

FIG. 2

*Reaction mixture contained 4 mM methionine and 3.2 mM sodium sulfite, 20 mM Tris buffer, pH 7.8. Reaction time = 60 min.

Effect of Transition Metals Found in Soy Proteins on the Formation of Methanethiol from Sulfite and Methionine

FIG. 3

Fluorescein degradation by free radical in (!) Control Fluorescein solution with no additive (n=2); (#) a corresponding amount of a 30 uM sodium sulfite and 20 uM manganese chloride solution (n=2); (□) a corresponding amount of a 180 uM sodium sulfite and 120 uM manganese chloride solution. The assay was conducted by the method of Moore and others, 2006.

FIG. 4

Figure 5. Inhibition of methanethiol production in commercial ISP by DMPO. A) is the methanethiol peak area from the control ISP slurry (with 3.2 uM sulfite, 2 uM manganese & 4 mM methionine added) without DMPO and B) is from the ISP slurry (with 3.2 uM sulfite, 2 uM manganese & 4 mM methionine added) with added DMPO.

FIG. 5

SOY PRODUCTS WITH REDUCED LEVELS OF SULFITE, FREE RADICALS AND METHANETHIOL

CROSS REFERENCE TO RELATED APPLICATIONS

This application is a continuation-in-part of application Ser. No. 10/421,955 filed Apr. 24, 2003 now U.S. Pat. No. 7,147,878, which claims the benefit of U.S. Provisional Application No. 60/375,429, filed Apr. 26, 2002.

BACKGROUND OF THE INVENTION

Isolated soy proteins (ISP) contain from 17 to 33 parts per million (ppm) free sulfites which are being formed after the isoelectric precipitation step of ISP processing (Stine, Boatright and Lu, 2004). Soybeans contain a relatively high number of transition metals, including manganese (Waggle and Kolar, 1979). When sulfites, manganese and oxygen are combined in solution, sulfite-free radicals are generated (Moya and other, 1999). Further reaction of the sulfite-free radicals with oxygen can produce sulfate-free radicals (Ermakov and Purmal, 2002). This spontaneous reaction involving sulfite, manganese and oxygen, appears not to have been previously documented in any human food. Sulfite- and sulfate-free radicals can contribute to the degradation of the essential amino acids in proteins (Ido and Kwanishi, 1991), which can alter the functional and nutritional characteristics of the protein.

Because there is no previously reported occurrence of sulfite- or sulfate-free radicals in foods, there are few studies on the toxicity of these powerful oxidants to humans. Among the studies that do exist, sulfite-free radicals have been linked to DNA damage, cancer (Shi and Mao, 1994; Jameton and others, 2002), and atherogenesis (Laggner and others, 2005). Also, because sulfate-free radicals are very reactive toward the oxidation of methionine residues, they may also play a role in the development of Alzheimer's disease and Parkinson disease (Choi and others, 2006; Clementi and others, 2006).

Boatright and others (2006) found that the sulfite content of ISP is elevated during ISP processing, with a rather large increase occurring after the protein is precipitated and separated from whey (soluble components at pH 4.5) during isoelectric precipitation. The present invention is directed to treating ISP with cystine or iodate to reduce the level of sulfite, sulfite free-radicals, sulfate free radicals and other free radicals generated from sulfite free radicals, and methanethiol in ISP.

The use of iodate to treat textured soy protein (TSP) was described in U.S. Pat. No. 4,259,364 to Chung (1981). The patent discloses preparing a textured soy protein by a thermoplastic extrusion process and subsequently washing the TSP with an iodate solution to remove oxidized flavor precursors.

TSP is very different from ISP. Sulfites have not been reported in TSP. Chung proposed that iodate be added to TSP to oxidize the precursors of flavor compounds.

In the present invention, the addition of iodate or cystine during the processing of ISP inhibits sulfite and the subsequent formation of sulfite free-radicals, sulfate free radicals and other free radicals generated from sulfite free radicals, and methanethiol. Iodate oxidizes the sulfites to sulfates. Cystine reacts with free sulfites to form cysteine-S-sulfonates. Transition metals such as manganese, ferrous iron, ferric iron and copper are found in soy proteins (Waggle and Kolar, 1979). The free radicals resulting from the reaction between, for example, manganese and sulfites are involved in the degradation of methionine to produce methanethiol.

SUMMARY OF THE INVENTION

It is an object of the present invention to provide methods of reducing sulfites associated with soy products and compositions containing soy products. In one aspect of the invention there is provided a method for reducing the sulfites in soy products and compositions containing soy products by adding to a soy product or composition containing a soy product at least one food grade iodate compound or a cystine compound such as L-, D-, or DL-cystine.

In an embodiment of the invention, at least one food grade iodate compound or cystine compound is admixed with the soy product or composition during processing of the soybean product or composition.

It is also an object of the present invention to provide a soy product or composition containing a soybean product, especially food Items, having decreased sulfite content.

It is also an object of the present invention to provide a soy product or composition containing a soybean product, especially food Items, having decreased sulfite free-radicals, sulfate free radicals and other free radicals generated from sulfite free radicals.

It is also an object of the present invention to provide a soy product or composition containing a soybean product, especially food Items, having decreased methanethiol content.

These and other objects and characteristics of the present invention will become apparent from the further disclosure of the invention which is given hereinafter with reference to the accompanying drawing and detailed description of the invention.

DEFINITIONS

As used herein, the terms "soybean(s)" or "soy" or "soy product(s)" means any soybean based product, including, but not limited to, whole soybeans, soybean pieces, soy meal, soybean flour, soybean milk, soy protein concentrate, soy protein isolate (SPI), etc.

Isolated soy protein (ISP) is also referred to as Soy Protein Isolate (SPI). ISP is prepared by removing most of the non-protein components from defatted soybeans. By definition, it is at least 90% protein and is very low in carbohydrates and lipids.

Soy protein concentrates (SPC) is prepared by removing most of the soluble carbohydrate from defatted soybeans. By definition, it is at least 70% protein and is very low in lipids.

The "iodate compounds" used in the methods and compositions disclosed herein include sodium iodate or potassium iodate, and any other food grade iodate compound that reduces sulfite, free radical and methanethiol in soy products or compositions.

The "cystine compounds" used in the methods and compositions disclosed herein include L-cystine, D-cystine or DL-cystine, and any other cystine compound that reduces reduces sulfite in soy products or compositions.

For the purposes of the present invention, the term "a" or "an" entity refers to one or more of that entity. As such, the terms "a" (or "an"), "one or more" and "at least one" can be used interchangeably herein. It is also to be noted that the terms "comprising", including", and "having" can be used interchangeably.

The expression "a compound selected from the group consisting of" refers to one or more of the compounds in the list that follows, including mixtures (i.e. combinations) of two or more of the compounds.

The term "headspace" means the volume remaining above the sample in a partially filed container composed of atmospheric gases (nitrogen, oxygen, etc.) and volatile compounds from the sample in the container.

An isolated molecule is a compound that has been removed from its natural milieu. As such, "isolated" does not necessarily reflect the extent to which the compound has been purified. An isolated compound of the present invention can be obtained from its natural source and partially purified such that other components remain present in the mixture, or can be produced using molecular biology techniques, or can be produced by chemical synthesis, for example.

DETAILED DESCRIPTION OF THE INVENTION

The present invention provides soy products and methods of making soy products comprising less than 100% naturally-occurring sulfite and less than 100% naturally occurring sulfite free-radicals, sulfate free radicals and other free radicals generated from sulfite free radicals, and less than 100% of naturally occurring methanethiol. In particular, modified soy products wherein naturally occurring sulfite, sulfite free-radicals, sulfate free radicals and other free radicals generated from sulfite free radicals, and methanethiol are present at a 1% to 95% reduction over naturally occurring levels and wherein the product has a reduction in the sulfites and sulfite free-radicals, sulfate free radicals and other free radicals generated from sulfite free radicals, associated with soy protein product are provided. In particular, modified soy products wherein naturally occurring sulfite, sulfite free-radicals, sulfate free radicals and other free radicals generated from sulfite free radicals, and methanethiol are present at a 50% to 95% reduction over naturally occurring levels and wherein the product has a reduction in the sulfites and sulfite free-radicals, sulfate free radicals and other free radicals generated from sulfite free radicals, associated with soy protein product are provided.

Sulfite was quantified in both commercial and laboratory prepared ISP samples. Commercial ISP contain 22 and 31 ppm sulfite as measured by the Optimized Monier-Williams method (AOAC Official Method 990.28). A method was developed to cryogenically trap and quantify the sulfur dioxide produced by the Optimized Monier-Williams method using gas chromatography/mass spectrometry (GC/MS). The same commercial ISP samples were found to contain 17 and 27 ppm sulfite, respectively, with the GC/MS methods. A laboratory prepared ISP contained 33 ppm sulfite and defatted soybean-flakes contained only a trace. The results are summarized in Table 1.

TABLE 1

Sulfite Content of Isolated Soy Proteins Determined by the Optimized Monier-Williams Method and by Quantifying $SO_2$ from the Monier-Williams Method[1]

| Isolated Soy Proteins | Monier-Williams | Quantifying $SO_2$ |
|---|---|---|
| Laboratory prepared ISP | n.d. | 33.0 (0.8)[2a] |
| PTI Supro 500E | 30.7 (0.0)[a] | 26.3 (0.2)[b] |
| ADM ISP (no additives) | 22.0 (0.5)[b] | 16.8 (0.2)[c] |
| ADM ISP (w DTT added before adding acid) | n.d. | trace[3] |
| ADM ISP (w DTT added after boiling) | n.d. | 16.0 (0.5)[c] |
| Defatted-white flakes (ADM) | n.d. | trace[3] |

[1] mg/kg
[2] Values in parentheses are standard errors
[3] peak area for adding DTT before boiling = 11,511 (785); peak area for DF = 4034 (1,865). The minimum peak area on the standard curve of 78,081 corresponds to 6.3 ppm.
n.d. = not determined
Means within columns and within rows with no common superscripts differ (P < 0.05).

Methanethiol is quantified in soybean slurries prepared from two different soy protein concentrates (SPC) and two different soy protein isolates (SPI) with ethanethiol as an internal standard (Lei and Boatright, 2001). Methanethiol levels are 172 and 237 parts per billion (ppb) dry basis in the SPC, and 237 and 167 ppb dry basis in the SPI. These values correspond to odor values of 86 and 118 in 10% SPC slurries, and 80 and 56 in 6.7% SPI slurries. Boatright (2002) devised a simple and rapid GC/MS method to quantify methanethiol in the headspace above soymilk and aqueous slurries of soy proteins by cryofocusing an internal standard along with static headspace volatiles. Headspace methanethiol levels ranged from 0.024 $mg/m^3$ in soymilk to 0.184 $mg/m^3$ in aqueous slurries of commercial ISP.

The soy protein products and compositions of the present invention can contain a soy component such as, for example, soy flour, soy bean, soy meal, soy paste, soy milk, soy protein concentrates and soy protein isolates. Starting materials for making the present soy protein products can be obtained commercially from Archer Daniels Midland, (Decatur, Ill.) or from other commercial sources.

The soy protein products and compositions of the present invention can be used in food items such as in a drink, a fast food item, a vegetarian dish, a meat item, an imitation seafood item, a structured meat product, an oil, a dairy item or an imitation cheese. The list above is not intended to be limiting. Soy protein can now be used instead of any protein in recipes in which protein is incorporated. Starting materials for making these products are widely available commercially.

Because the appearance of sulfite corresponds with the formation of methanethiol, which is shown to originate from methionine residues in the soy protein, methanethiol from isolated soy proteins is closely associated with the appearance of naturally occurring free sulfites. This occurs at a certain point during ISP processing and continues in the finished product. Table 2 shows the level of methanethiol from ISP is directly related to the level of both sulfite and methionine.

TABLE 2

Relative methanethiol levels in headspace of ISP aqueous slurries as influenced by addition of sulfite and methionine

| | Methanethiol Peak Area[a] Measured (@) | | |
|---|---|---|---|
| | 60 min | 90 min | 120 min |
| ISO-I only[b] | 502 (91)[f] | 693 (45)[g] | 608 (68)[g] |
| ISO-I + Sulfite[c] | 2551 (97)[h] | 4598 (626)[i] | 3302 (270)[i] |
| ISO-I + Methionine[d] | 1382 (35)[j] | 3032 (332)[i] | 3437 (728)[i] |
| ISO-I + Sulfite + Methionine[e] | 12887 (390)[k] | 14114 (332)[k] | 18633 (1971)[k] |

[a]Expressed as mean methanethiol peak area (m/z 47) for duplicate measurements from 2-ml headspace sample analyzed with GC/MS and std. errors were shown in parentheses.
[b]Only 300 mg ISO-I commercial sample suspended in 25 ml DI water.
[c]300 mg ISO-I commercial sample suspended in 25 ml DI water with 3.2 mM sodium sulfite.
[d]300 mg ISO-I commercial sample suspended in 25 ml DI water with 4.0 mM methionine.
[e]300 mg ISO-I commercial sample suspended in 25 ml DI water with 3.2 mM sodium sulfite and 4.0 mM methionine.
[f-k]data in a column or row without same letter differ significantly (P < 0.05).

Figure 1:
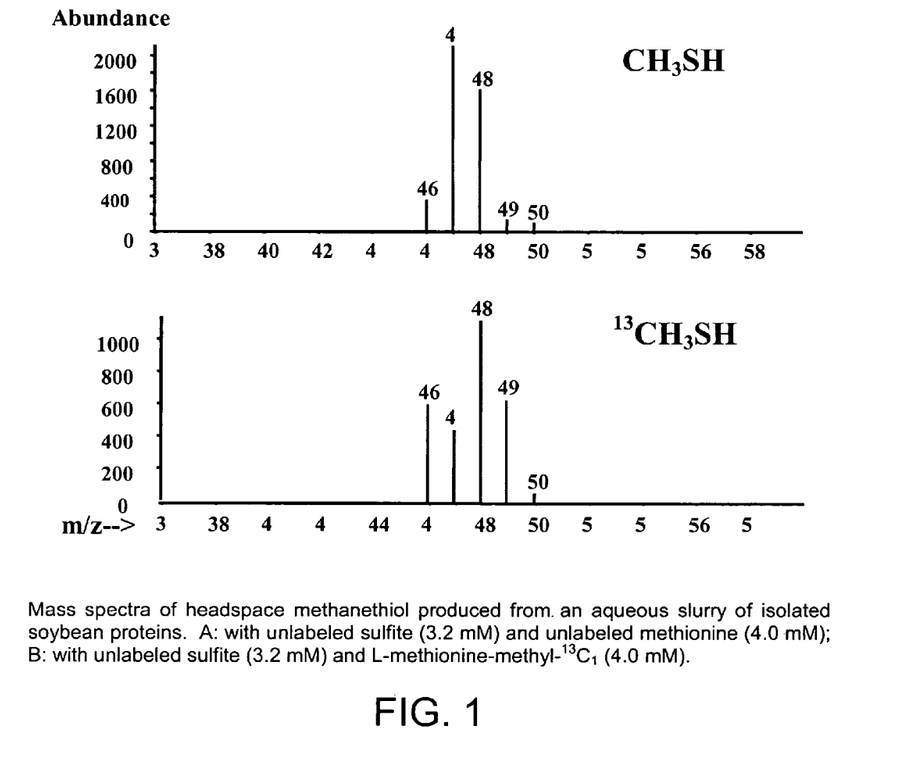
FIG. 1 shows mass spectra demonstrating that carbon-13 labeled methyl group from methionine was integrated into methanethiol.
Figure 2:
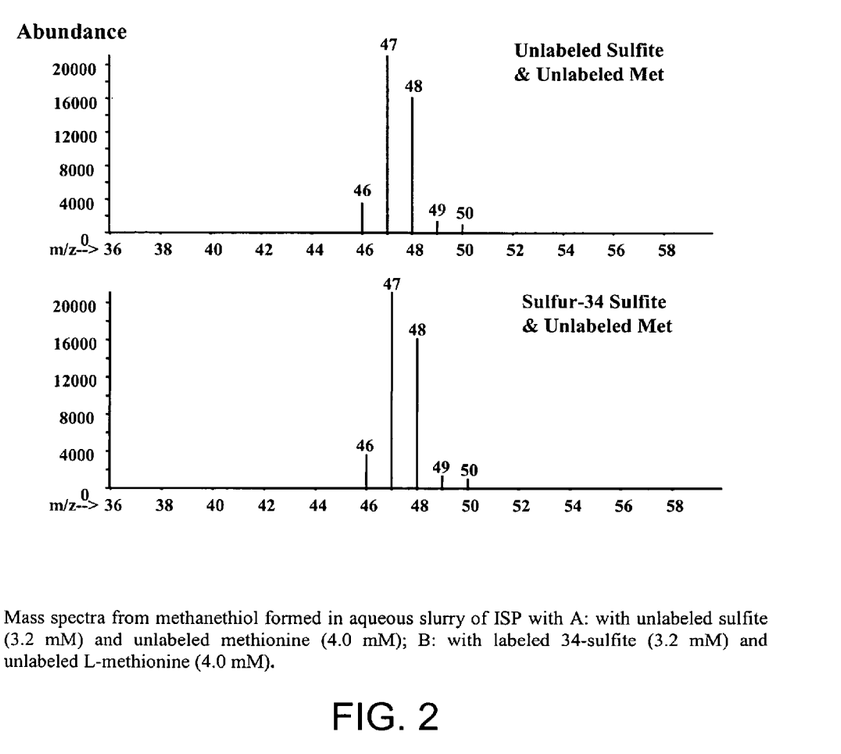
FIG. 2 shows mass spectra demonstrating that sulfur from $^{34}$S-labeled sodium sulfite was not incorporated into methanethiol.

When sulfite is added to aqueous slurries of ISP, a large (5-fold) increase in methanethiol occurs. The addition of methionine also causes an increase (3-fold) in methanethiol, but the combination of sulfite and methionine result in a much greater increase (26-fold) than either additive alone. FIG. 1 shows the mass spectra of the methanethiol formed with addition of L-methionine-methyl-$^{13}C_1$ and unlabeled sulfite shows that the carbon-13 labeled methyl group is integrated into methanethiol. FIG. 2 shows mass spectra indicating that no incorporation of isotopic sulfur is observed when $^{34}$S-labeled sodium sulfite is applied. Thus, the sulfur of methanethiol originates from methionine.

Figure 3:
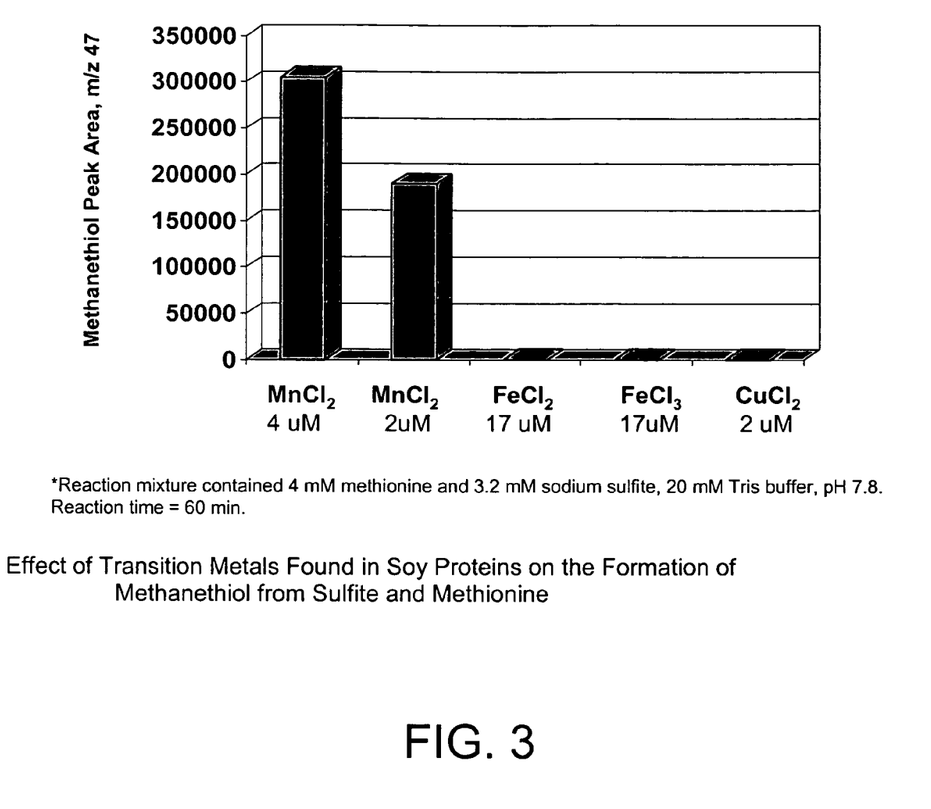
FIG. 3 is a graph showing the effect of transition metals found in soy proteins on the formation of methanethiol from sulfite and methionine.

Transition metals such as manganese, ferrous iron, ferric iron and copper are found in soy proteins (Waggle and Kolar, 1979). FIG. 3 shows the effect of transition metals on the formation of the methanethiol and methionine production. Neither ferrous nor ferric iron, at levels found in ISP, contribute to the reaction. Copper exhibits a mild effect, but manganese at levels found in a 1 percent ISP solution (2 µM) strongly catalyzes the production of methanethiol. The typical manganese content of ISP is 17 parts per million (Waggle and Kolar, 1979).

In mixtures of methionine, sulfite and manganese, both the carbon and sulfur molecules of methanethiol originate from methionine. Wainwright et al (1972) report that both iron and manganese in the presence of sulfite and oxygen catalyze the degradation of methionine and the production of methanethiol, but only below pH 3. Wainwright (1972) shows only data from reactions with iron. However, it appears that Wainwright made an incorrect assumption about the effect of pH in the manganese reaction. Yang (1970) reports that methionine, in the presence of manganese, sulfite and oxygen at neutral pH, rapidly oxidizes to methionine sulfoxide. Methanethiol is not reported to be produced from this reaction. The proposed mechanism for the reaction involved superoxide anion and hydroxyl radicals. Yang (1973) also report the destruction of tryptophan under similar conditions.

Ermakov and Purmal (2002) review of the catalysis of sulfite oxidation by manganese provides further examples of the strong catalytic power of manganese and concludes that trace levels of iron are also involved. The oxidation of sulfite in the presence of oxygen forms the sulfite radical anion, and subsequently, the $SO_5^{1-X}$ (peroxy radical) and $SO_4^{1-X}$ (sulfate radical anion). Laggner et al (2005) propose that sulfites in wine could facilitate low density lipoprotein oxidation in the presence of copper, but provide no direct evidence for the presence of sulfite radicals.

The formation of the methionine radical cation (Met$^{+X}$) requires ∃1.3 V of reducing power (Wilson et al, 1994), and thus is not a reaction that occurs without a strong oxidant or a specific enzyme. When attempting to isolate such an enzyme from soy proteins, it is observed that whenever the "protein fraction" that contributes to methanethiol production with the addition of sulfite and/or methionine is desalted, dialyzed, or treated with EDTA, the catalytic power is lost. Also, extensive hydrolyzes of purified protein fractions (using trypsin or carboxypeptidase) result in no significant loss in the rate of methanethiol production.

Regarding the degradation of methionine (Met/Met$^{+X}$) by sulfite, manganese and oxygen mixtures, the reduction potential required to catalyze this reaction (∃1.3 V) is unlikely to be achieved at the rate observed by the sulfite radical, superoxide radical anion or $SO_5^{1-X}$ with reducing powers of 0.63 V, −0.16 V and 1.1 V, respectively (Huie and Neta, 1984). There is no reported occurrence of a sulfate-free radical in any food product. However, this radical does have a reducing power from 2.5 and 3.1 V (Eberson, 1882), which is similar to or greater than the hydroxyl radical (ca. 2.5 V).

Figure 4:
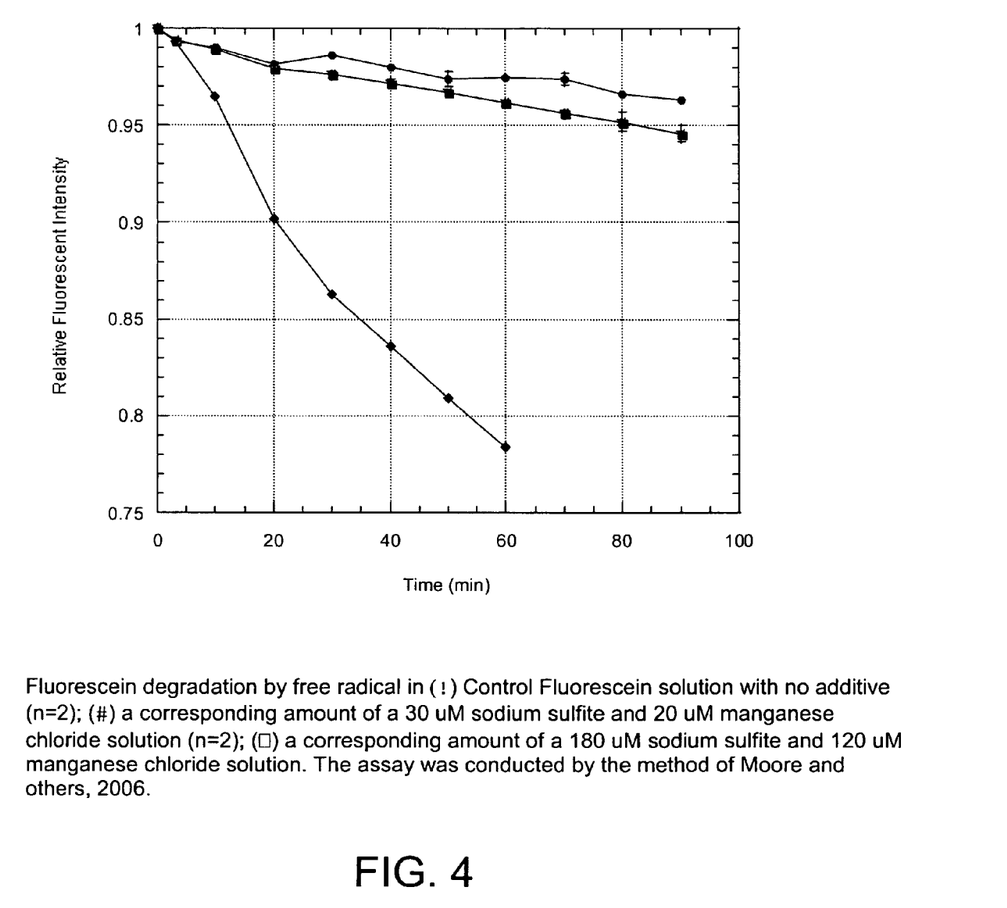
FIG. 4 shows the fluorescein degradation by free-radicals in different solutions.

In order to measure the oxidizing power of free radicals in an extract from aqueous ISP slurry and compare this with the sulfite-free radicals produced in mixtures of sulfite and manganese, a slight modification of the fluorometric method of Moore and others (2006) is used. A 30 µM sodium sulfite and 20 uM manganese chloride solution causes a slight increase in fluorescein degradation over time as compared to the control as shown in FIG. 4. These levels of sulfite and manganese are comparable to the level found in a 5 percent ISP slurry. At six times the level of sulfite and manganese (180 µM and 120 µM, respectively), the degradation of fluoroscein is accelerated, clearly demonstrating the ability of sulfite/manganese solutions to generate powerful free radicals. To measure the ability of aqueous extracts of ISP to degrade fluorescein, fluorescent readings are taken at 1 min and at 90 min intervals. The results are summarized in Table 3. A control with only fluorescein and a buffer is also prepared.

TABLE 3

Reactive Oxygen Species in Extracts from Control and Iodate Treated Isolated Soy Protein as Measured by Fluorescein Degradation

| | Relative Fluorescent Intensity[a] |
|---|---|
| Fluorescein without ISP Extract | 0.9957 (0.0007)a |
| Fluorescein with Extract from Control ISP | 0.9873 (0.0028)b |
| Fluorescein with Extract from Iodate Treated ISP | 0.9960 (0.0003)a |

[a]Fluorescence After 1.5 hours divided by the flourescence at 1 min.
[b]Values in parenthesis are standard errors (n = 3)
[c]Means with different letters differ significantly (P < 0.05).

Figure 5:
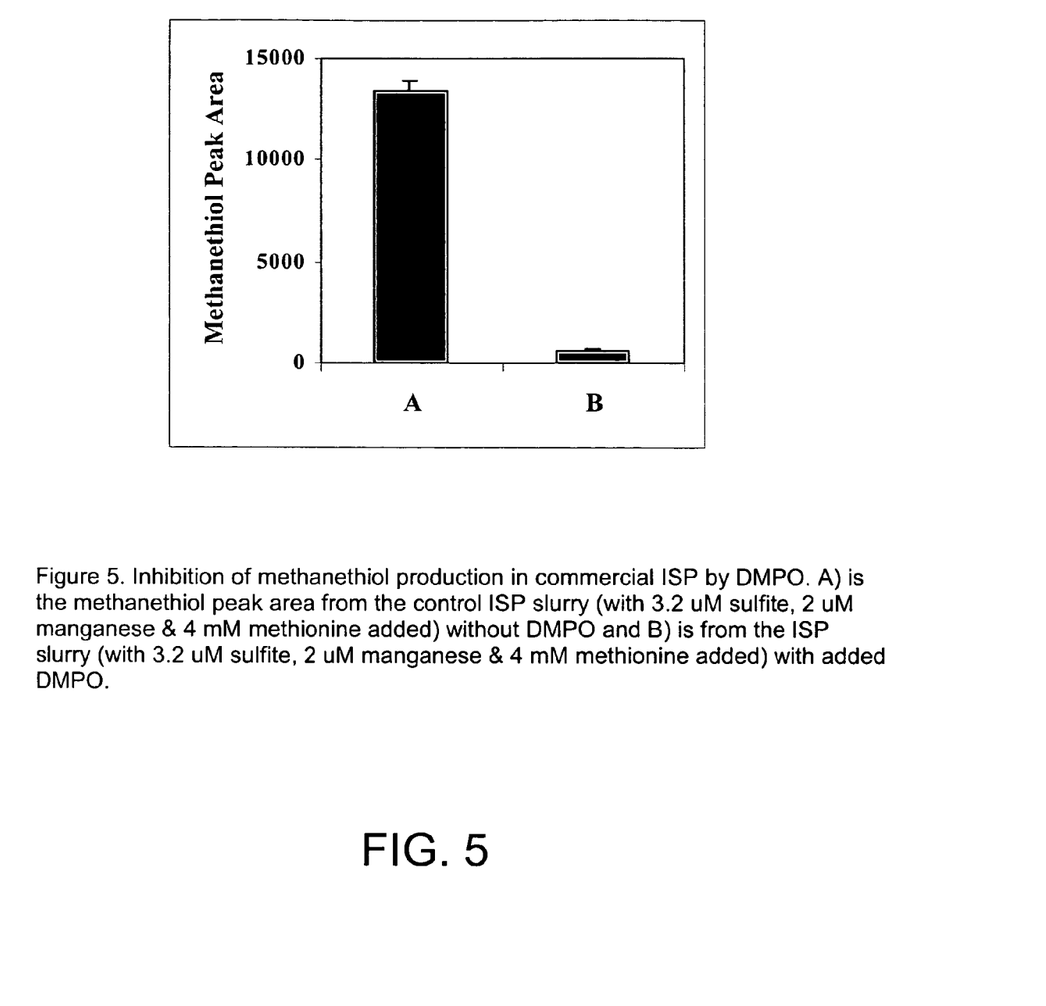
FIG. 5 is a graph showing the inhibition of methanethiol production in aqueous slurries of commercial ISP with added sulfite, manganese and methionine using DMPO.

While the increase in fluorescein degradation is significant with the non-treated ISP (i.e., the iodate treated inhibited the free radials in the aqueous extract), it is not possible to determine how efficient this aqueous extraction is at recovering the free-radicals and the free-radical generating components from ISP. To further investigate the role of free-radicals in the production of methanethiol from methionine degradation, Table 4 summarizes the effect of the free radical trapping agent 5,5-dimethyl-1-pyrroline N-oxide (DMPO) in solutions of methionine, sulfite and manganese. FIG. 5 shows the effect of DMPO on aqueous slurries of ISP with added methionine, sulfite and manganese.

TABLE 4

Table 4. Inhibition of $Mn^{2+}$-Sulfite Catalyzed Methanethiol Formation by DMPO

| Additive[1] | Methanehtiol Peak Area[2] |
|---|---|
| Control (no additive) | 399,146 (36,613) |
| 15 mM DMPO | 3,420 |

[1]Reaction mixture contained 2 uM Mn(II), 3.2 mM sulfite and 4 mM methionine
[2]Peak area from GC-MS from 2 mL headspace after stirring 60 min
[2] Values in parentheses are std. errors In both systems, DMPO significantly reduces the production of methanethiol. When 15 mM DMPO is added to the control ISP slurries such as those set forth in Tables 5 to 7, no methanethiol is detected. This further demonstrates the role of free radicals in methanethiol production in ISP slurries. In a simple mixture of methionine, sulfite and manganese as set forth in Table 4, the generated free radicals are largely focused on the degradation of methionine. The corresponding methanethiol peak area is 399,146. As shown in FIG. 5, when DMPO is mixed with a commercial ISP slurry, the methanethiol peak area is considerably smaller as opposed to ISP slurry without DMPO which peaks at 13,460.

This also demonstrates that in ISP there are other components that react with free radicals besides methionine. Ito and Kawanishi (1991) report that the amino acids tryptophan, glycine and proline are the most reactive toward the sulfate radical when added to albumin. Erben-Russ and others (1987) report that the sulfite radical is very reactive toward the flavonoid quercetin, the carotenoids crocin and crocetin, and glutathione. In fact in the one-electron oxidation of methionine there are many other reaction products beside methanethiol (Miller and others 1998; Hug and others 2000) and the wide variety of components within ISP may affect the products resulting from methionine degradation.

When methionine is added to ISP samples, particularly in combination with sodium sulfite, the methionine is rapidly oxidized into methanethiol and other degradation products. Soybeans have a naturally high level of manganese which in combination with the intrinsic or added sulfite, produces sulfite-free radicals. As shown in Table 5, the addition of L-cystine during ISP processing decreases the level of sulfite in ISP samples from 26∇2 to 8∇1 ppm. As shown in Table 6, adding potassium iodate during ISP processing decreases the level of sulfite from 21∇1 to 12∇1 ppm. A similar effect is observed when potassium iodate is added during processing of commercial ISP as shown in Table 7. Because methanethiol is related to the level of sulfite and sulfite free-radicals, sulfate free radicals and other free radicals generated from sulfite free radicals in ISP slurries, in all cases where cystine or iodate compounds are added to soy proteins, the level of methanethiol is also reduced as shown in Tables 5 to 7.

TABLE 5

Effect of L-Cystine on Sulfite Content and Headspace Methanethiol of Aqueous Slurries of Laboratory Isolated Soy Proteins

| Process Stage | Methanethiol Peak Area[1] | Sulfite Content, ppm |
|---|---|---|
| Control ISP | 1,140 (271)a | 26 (2)a |
| L-Cystine added during processing | n.d. (0)b | 8 (1)b |

[1]Mean peak areas from 2 replications
[2] Values in parentheses are std. errors
[C] Means with different letters differ significantly (P < 0.05).

TABLE 6

Effect of Potassium Iodate on Sulfite Content and Headspace Methanethiol of Aqueous Slurries of Laboratory Isolated Soy Proteins

| Process Stage | Methanethiol Peak Area[1] | Sulfite Content, ppm |
|---|---|---|
| Control ISP | 1,176 (206)a | 20.74 (0.9)a |
| Iodated added during processing | n.d. (0)b | 11.8 (1.4)b |

[1]Mean peak areas from 2 replications
[2] Values in parentheses are std. errors
[C] Means with different letters differ significantly (P < 0.05).

TABLE 7

Effect of Potassium Iodate Added During Commerial Processing on Headspace Odorants from Aqueous Slurries of Isolated Soy Proteins

| Additive | Methanethiol Peak Area[1] | Iodine Content[4] |
|---|---|---|
| ISP, Control (no additive) | 1,964 (65)a | 0.09 |
| ISP with Iodated Added During Processing | 738 (155)b | 73 |

[1]Mean peak areas from 4 replications
[2] Values in parentheses are std. errors
[3] Means with different letters differ significantly (P < 0.05).
[4]parts per million The present invention provides for a method of reducing sulfites and sulfite free-radicals, sulfate free radicals and other free radicals generated from sulfite free radicals, and methanethiol in ISP by adding a cystine compound such as L-cystine; D-cystine; DL-cystine or a food grade iodate compound such as potassium iodate or sodium iodate. The following is the reaction of the iodate compound with sulfite converting the sulfite into sulfate, and iodate into iodide:

$$IO_3^- + 3HSO_3^- \rightarrow I^- + 3SO_4^{2-} + 3H^+$$

The reaction with a cystine compound will convert free sulfite in ISP to cysteine-S-sulfonate. The iodate compound or cystine compound can be mixed with the soy product or ISP as a solid or in solution. The concentration range of total iodine (including molecular iodine, iodide and iodate) in ISP with added iodate is from about 0.2 to about 73 ppm.

Preparation of the ISP Slurry

Defatted soy flakes can be obtained from the Archer Daniels Midland Company (Decatur, Ill.). Flakes are ground in a coffee mill for 10 sec to produce a defatted soy flour. Laboratory ISP is prepared by dispersing hexane-defatted soybean flour in water (1 part flour to 10 parts water) at 22° C. followed by the addition of 1 N sodium hydroxide, as needed, until a pH of 8.5 to 9 is achieved and maintained for 15 minutes. After centrifugation at 1500×g for 10 minutes, the supernatant is adjusted to a pH of 4.5 with 1 N HCl to precipitate proteins. Following centrifugation at 1500×g for 10 minutes, the precipitate is washed twice with water, and the protein isolate is adjusted to pH 7 with 1 N NaOH.

Treatment of the ISP Slurry with Potassium Iodate

Potassium iodate is added during ISP processing following centrifugation at 1500×g for 10 min. A precipitate is formed which is washed with water (as a control), or water containing 0.1 g potassium iodate per 300 mLs (for a total of 0.2 g K iodate per the precipitated protein from 100 grams of starting defatted soybean flour). After another centrifugation at 1500×g for 10 min, the precipitated proteins are suspended in a solution of 0.05 g potassium iodate per 300 mLs water and adjusted to pH 7 with 1 N NaOH and freeze dried.

Treatment of the ISP Slurry with L-Cystine

When L-cystine is added to the ISP slurry immediately after the ISP slurry is adjusted to pH 7, L-cystine is added in the dry form at a level of 0.3 g L-cystine per 100 g of starting defatted flour. After stirring the soy protein/cystine mixture for 10 min, the resulting slurry is immediately transferred into a glass flask and placed in a boiling water bath. The protein slurry is stirred and brought to 77° C. within 4 minutes where it is held for 15 seconds, cooled to 40° C. in an ice bath, and freeze-dried.

Sulfite Analyses

Sulfite in isolated soy proteins is determined using the Optimized Monier-Williams method as described by Stine and others (2004). The Monier-Williams method is modified by inserting 1.5 m of a 7.9 mm OD (6.4 ID) FEP tubing with two-13 cm diameter loops. The tubing loops are submerged in liquid nitrogen to cryogenically trap sulfur dioxide after the entire apparatus is flushed with nitrogen for 15 min. Each end of the FEP tubing is fitted with Teflon shutoff valves that connect the cryogenic trap to the condenser and the glass tubing leading to the 3% $H_2O_2$ solution. At the end of the distillation, shutoff valves are closed and detached from the rest of the apparatus. A two liter Tedlar bag is connected to the downstream end of the FEP tubing and the valve between the Tedlar bag and FEP tubing is opened. The FEP loop is then removed from the liquid nitrogen and allowed to stand at room temperature for 15 min. A septum is then attached to the closed shutoff valve. The valve is opened and nitrogen gas is introduced through the septum with a 20 gauge needle to flush the sulfur dioxide into the Tedlar bag. This is continued until the 2 L Tedlar bag is filled (about 20 secs). The valve between the Tedlar bag and FEP tubing is closed, and the Tedlar bag is manually rotated at about 72 rpm for 30 sec. to facilitate mixing of the sulfur dioxide in the nitrogen gas. This rotation of the Tedlar bag is repeated prior to each injection. Five mL portions of gas are removed from the Tedlar bag's septum and injected into the GC/MS. A standard curve is prepared by adding varying amounts of HMS to the Monier-Williams apparatus. The sulfur dioxide response from the samples is multiplied by 80/134 (the molecular weight of sulfite divided by the molecular weight of HMS) to calculate the amount of sulfite in ISP from the standard curve.

Static Headspace Analyses

For static headspace analyses, ISP solutions are placed in a 1 L flask sealed with a septum and stirred. A specific volume of the unconcentrated headspace is withdrawn after various times using a 25 mL gas tight syringe (preheated to 45° C.) equipped with an inert gas sampling valve.

Gas Chromatography/Mass Spectroscopy (GC/MS)

GC/MS is accomplished on a Hewlett-Packard Model 5890 Series II GC with a 5971A mass spectrometer, a MS-Novent system (SGE Intl., Ringwood, Australia), an indirect liquid nitrogen trap (SGE Intl.) at the beginning of the column to cryo-focus analytes, and a post-column splitter (sniff port). The injection sequence is begun by bringing the liquid nitrogen trap to about −60EC. The purge valve is closed for the first 2 min of the run. The MS No-vent is then turned on and the GC inlet septum purge is blocked. The headspace sample is injected at a rate of 5 mL/min followed by a 2-min wait. The MS No-vent is then turned off followed by a 0.5-min wait. The cap on the septum purge is removed, the flow of nitrogen to the cryogenic-trap is stopped, and the GC run is begun. The column is an EC-5 capillary column (30 m×0.53 mm i.d.) with 1.2: m film thickness (Alltech Associates, Inc., Deerfield, Ill.). The helium flow-rate through the columns is 3 mL/min, with 1 mL/min entering the MS, and 2 mL/min being vented during the run. During the injection sequence, all column streams (from the injection port and the MS No-vent) are vented. The column temperature is held at 40 EC for 2 min, then increased at 5 EC/min to 165 EC where it is held for 5 min, then to 220 EC at 20 EC/min where it is held for 2.75 min. The electron ionization detector is set to detect select ions, including m/z 47 for methanethiol. The injection port temperature is maintained at 130 EC. Identification of compounds are by 1) comparison of mass spectra to a spectral database (NIST98) (ChemSW, Inc., Fairfield, Calif.); 2) comparison to retention times and mass spectra of authentic standards; and 3) comparison of olfactory response to authentic standards.

Statistical Evaluatons and Other Measurements

Statistical evaluations of treatment effects are done using the Statistical Analysis System (SAS, 1995) software package. Analysis of variances is performed by the ANOVA procedure. Least significant differences (LSD) values are computed at P #0.05 and comparisons between means are done using the Tukey-Kramer HSD test.

Measuring Reactive Oxygen Species (ROS)

Measuring reactive oxygen species (ROS) by fluorescein degradation is accomplished according to the method of Moore and others (2006). Measurements are made with a FluoroMax-3 spectrofluorometer (Jobin Yvon, Inc., Edison, N.J.) with Datamax software. The fluorescein solution is centrifuged at 10,000×g for 5 min before being diluted to the $9.28 \times 10^{-8}$ dilution in order to decrease the fluorescent drift over time.

The Relationship between Sulfite Free-Radicals, Sulfate Free Radicals and Other Free Radicals Generated from Sulfite Free Radicals, and Methanethiol Formation in ISP The relationship between sulfite free-radicals, sulfate free radicals and other free radicals generated from sulfite free radicals and methanethiol formation in ISP and mixtures of sulfite and manganese is further examined with 5,5-dimethyl-1-pyrroline N-oxide (DMPO), which is a free radical scavenger. For the sulfite/manganese system, 25 mL of the mixture is prepared with 20 mM Tris (pH 7.8) in a 50-ml round bottom flask (sealed with rubber septum) containing 2 μM Mn (II), 3.2 mM sulfite and 4.0 mM Met. The free radical scavenger (DMPO) is added and the mixture is stirred at 21° C. for 60 min before 2 ml of headspace sample is withdrawn for GC/MS SIM assay. An aqueous slurry of commercial ISP is examined by adding 300 mg of the commercial ISP to 25 mL deionized water in a 50-ml round bottom flask (sealed with rubber septum), followed by adding 15 mM DMPO. 2 mls of headspace is taken for GC/MS SIM analysis after the mixture is stirred at 21° C. for 60 min.

REFERENCES

Boatright, W. L. 2002. Effect of Gallic Acid on the Aroma Constituents of Soymilk and Soy Protein Isolates, *Journal of the American Oil Chemists' Society*, 79(4):317-323.

Boatright, W L, Lei Q and Stine C J, 2006. Sulfite Formation in Isolated Soy Proteins, *Journal of Food Science,* 71(3): 115-119.

Choi J; Sullards M C, Olzmann J A; Rees H D, Weintraub S T, Bostwick D E, Gearing M, Levey A I, Chin L-S. Li L, 2006. Oxidative Damage of DJ-1 Is Linked to Sporadic Parkinson and Alzheimer Diseases. Journal of Biological Chemistry, 281(16), 10816-10824.

Chung, Koo H, 1981. Flavor improvement of soy protein. U.S. Pat. No. 4,259,364.

Clementi M E, Pezzotti M, Orsini F, Sampaolese B, Mezzogori D, Grassi c, Giardina B, Misiti F, 2006, Alzheimer's amyloid ꓯ-peptide (1-42) induces cell death in human neuroblastoma via bax/bcl-2 ratio increase: An intriguing role for methionine 35. Biochemical and Biophysical Research Communications, 342(1), 206-213.

Eberson L, 1982. Electron-transfer reactions in organic chemistry. Advances in Physical Organic Chemistry, 18:79-185.

Erben-Russ M, Michel C, Bors W, Saran M, 1987, Determination of sulfite radical (SO.3-) reaction rate constants by means of competition kinetics, Radiation and Environmental Biophysics (1987), 26(4), 289-94.

Ermakov A. N.$^1$; Purmal' A. P.$^2$, 2002, Catalysis of HSO3-/SO32-Oxidation by Manganese Ions, *Kinetics and Catalysis*, Volume 43, Number 2, March 2002, pp. 249-260.

Hug G L, Bobrowski K, Kozubek H. Marciniak B, 2000. Photo-oxidation of methionine-containing peptides by the 4-carboxybenzophenone triplet state in aqueous solution. Competition between intramolecular two-centered three-electron bonded (S . . . S)$^+$ and (S . . . N)$^+$ formation. Photochemistry and photobiology, 72(1):1-9.

Huie R E, Neta P, 1984. Chemical behavior of SO.3- and SO.5-radicals in aqueous solutions. J Phys Chem, 88:5665-5669.

Ito K, Kawanishi S, 1991. Site-specific fragmentation and modification of albumin by sulfite in the presence of metal ions or peroxidase/hydrogen peroxide: role of sulfate radical. Biochemical and Biophysical Research Communications 176(3):1306-12.

Jameton R A, Muller J G, Burrows C J. 2002. Oxidative DNA damage from sulfite autoxidation catalyzed by manganese (III) Comptes Rendus Chimie, 5(5):461-466.

Laggner H, Hermann M, Sturm B, Gmeiner B M K, Kapiotis S, 2005 Sulfite facilitates LDL lipid oxidation by transition metal ions: A pro-oxidant in wine? FEBS Letters, 579(28): 6486-6492.

Lei, Q. and W. L. Boatright, 2001a. Development of a New Methanethiol Quantification Method Using Ethanethiol as an Internal Standard, *J. Agric. Food Chem.,* 49(8) 3567-3572.

Mameton R A, Muller J G, Burrows C J, 2002. Oxidative DNA damagefrom sulfite autoxidation catalyzed by manganese(III), Comptes rendus Chimie, 5:461-466.

Miller B L.; Kuczera K; Schoeneich C. 1998. One-Electron Photooxidation of N-Methionyl Peptides. Mechanism of Sulfoxide and Azasulfonium Diastereomer Formation through Reaction of Sulfide Radical Cation Complexes with Oxygen or Superoxide. Journal of the American Chemical Society, 120(14):3345-3356.

Moore J, Yin J-J, Yu L, 2006. Novel Fluorometric Assay for Hydroxyl Radical Scavenging Capacity (HOSC) Estimation. Journal of Agricultural and Food Chemistry 54(3), 617-626.

Moya H D, Neves E A, Coichev N, Niewahner J. 1999. A further demonstration of sulfite-induced redox cycling of metal ions initiated by shaking. Journal of Chemical Education, 76 (7):930-932.

SAS Institute Inc. 1995. JMP® User's Guide. Statistical Analysis System Institute, Cary, N.C.

Shi X. L. and Mao Y. 1994. 8-Hydroxy-2'-deoxyguanosine Formation and DNA Damage Induced by Sulfur Trioxide Anion Radicals, BIOCHEM BIOPH RES CO, 205(1):141-147.

Stine C J, Boatright W L, Lu G, 2004. Intrinsic Sulfite Content of Isolated Soy Proteins, *Journal of the American Oil Chemists' Society,* 81(9):829-833.

Waggle D H and Kolar, D W, 1979. Types of Soy Products, in Soy Protein and Human Nutrition, Academic Press, New York, 1979, p. 41.

Wainwright T, McMahon J F, McDowell J, 1972 Formation of methional and methanethiol from methionine. Journal of the Science of Food and Agriculture, 23(7):911-14.

Wilson S, Wilson G S, Glass R S, 1994. The effect of pH and complexation of amino acid functionality on the redox chemistry of methionine and X-Ray structure of [Co(en)$_2$ (L-Met)](ClO$_4$)$_2$.H$_2$O, J Inorg Biochem, 55:87-99.

Yang S F 1970 Sulfoxide formation from methionine or its sulfide analogs during aerobic oxidation of sulfite. Biochemistry, 9(25):5008-14.

Yang S. F, 1973. Destruction of tryptophan during the aerobic oxidation of sulfite ions. Environmental Research, 6(4): 395-402.

While this invention has been described with reference to several preferred embodiments, it is contemplated that various alterations and modifications thereof will become apparent to those skilled in the art upon a reading of the preceding detailed description. It is therefore intended that the following appended claims be interpreted as including all such alterations and modifications as fall within the true spirit and scope of this invention.

What is claimed is:

1. A method of reducing levels of sulfite and free radicals generated during production of isolated soy protein (ISP) comprising treating an aqueous slurry comprising soybean protein obtained from defatted soy flour or flakes with a food grade iodate to provide an ISP comprising from 0.2 to 73 parts per million iodine.

2. The method of claim 1, wherein the iodate is sodium iodate or potassium iodate.

3. The method of claim 1, wherein the iodate is potassium iodate.

4. A method of reducing methanethiol generated during production of ISP comprising admixing an effective amount of a food grade iodate compound with an aqueous slurry comprising soybean protein obtained from defatted soy flour or flakes to provide an ISP comprising from 0.2 to 73 parts per million iodine.

5. The method of claim 4, wherein the iodate is a compound selected from the group consisting of sodium iodate and potassium iodate.

6. The method of claim 4, wherein the iodate is potassium iodate.

7. The method of claim 4, wherein the naturally occurring level of methanethiol in the ISP is reduced by about 1% to about 95% relative to untreated ISP.

8. The method of claim 7, wherein the naturally occurring level of methanethiol in the ISP is reduced by about 95% relative to untreated ISP.

\* \* \* \* \*